Figure 1:
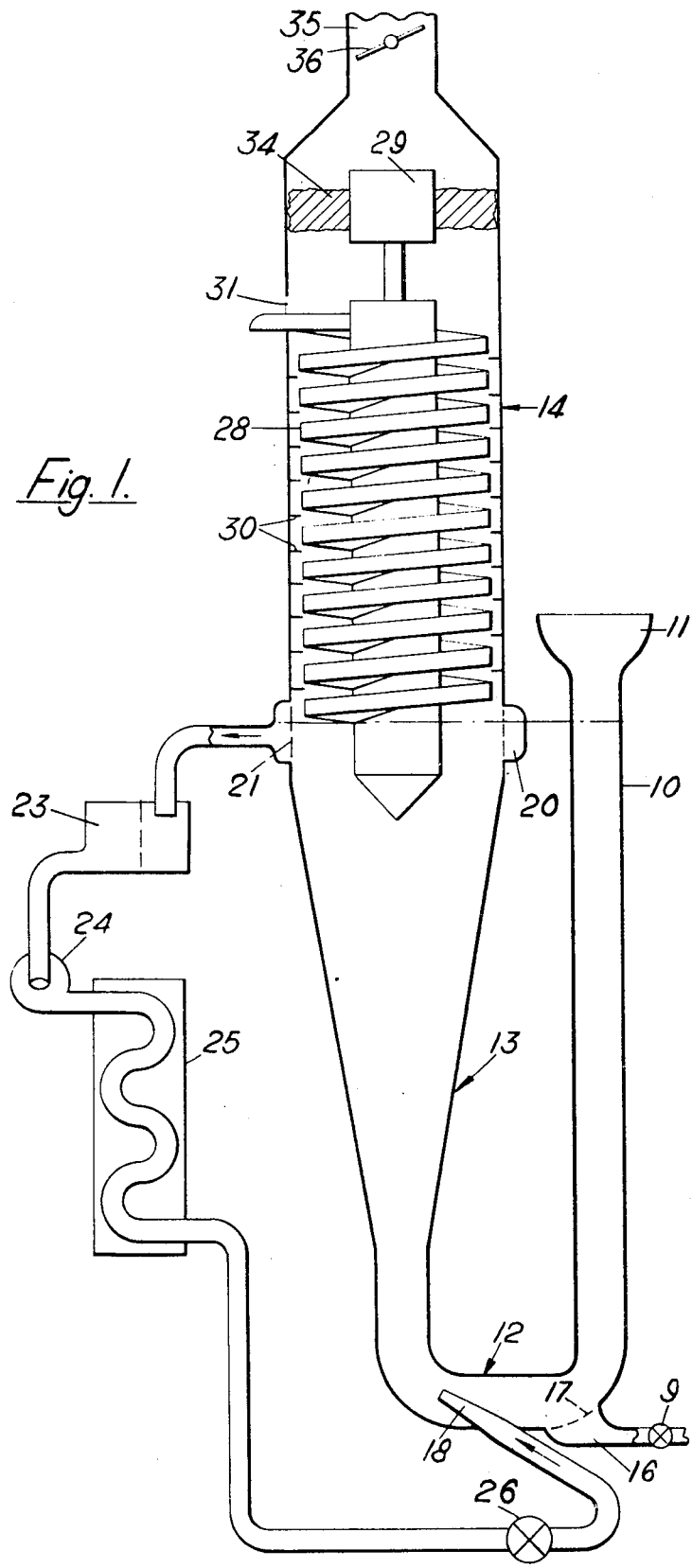

United States Patent
Dalgleish

[15] 3,649,306
[45] Mar. 14, 1972

[54] COOKING OF FOOD MORSELS

[72] Inventor: James McNair Dalgleish, Warwick, England

[73] Assignee: Golden Wonder Limited, Northants, England

[22] Filed: July 28, 1969

[21] Appl. No.: 845,390

[30] Foreign Application Priority Data

Aug. 8, 1968 Great Britain ...................... 37,985/68

[52] U.S. Cl. ...................................... 99/246, 34/9, 99/104, 99/207, 99/339, 99/403
[51] Int. Cl. ........................................................ B65d 9/00
[58] Field of Search .................... 99/246, 251, 252, 404, 405, 99/406, 410, 339, 355, 104, 207; 34/9

[56] References Cited

UNITED STATES PATENTS

| | | | |
|---|---|---|---|
| 2,853,937 | 9/1958 | Peck | 99/407 |
| 3,396,656 | 8/1968 | Forkner | 99/246 |
| 3,535,128 | 10/1970 | Willard | 99/246 |

Primary Examiner—Robert W. Jenkins
Attorney—Larson, Taylor & Hinds

[57] ABSTRACT

Surface water is removed from morsels of water-impregnated food (e.g., washed raw potato slices) before subsequent dehydration and cooking bypassing the morsels downwards through cold oil and draining off the separated water.

18 Claims, 7 Drawing Figures

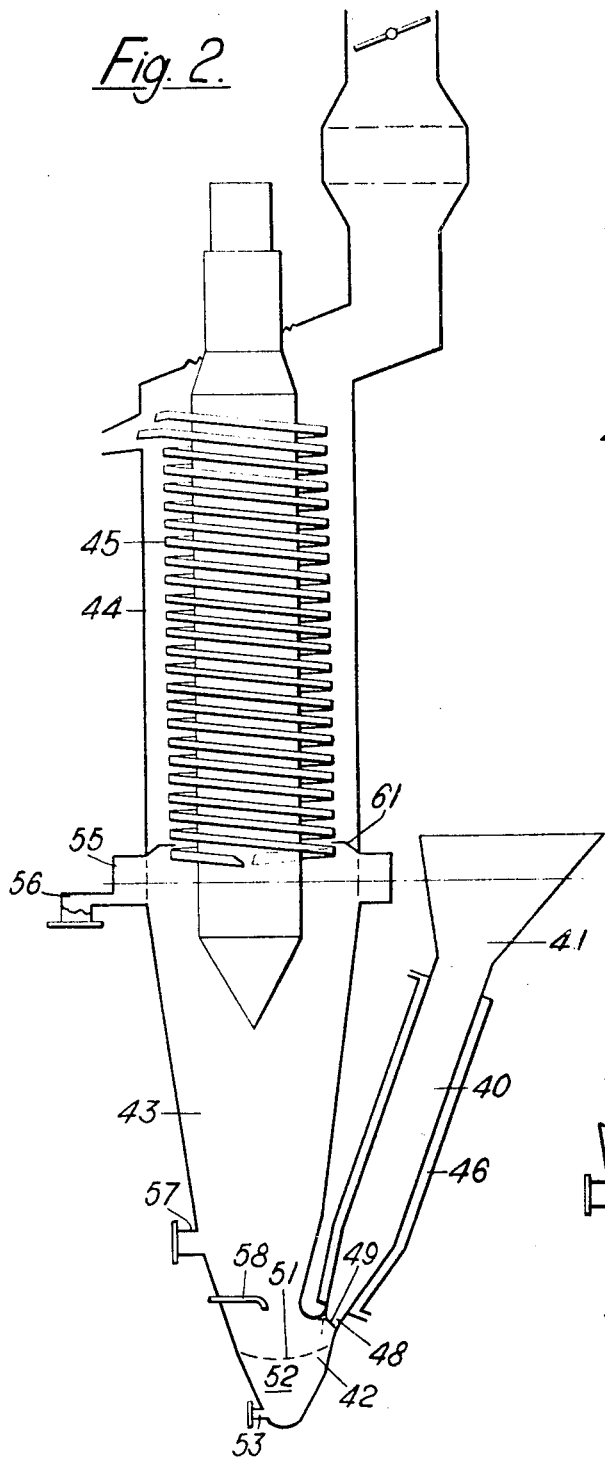
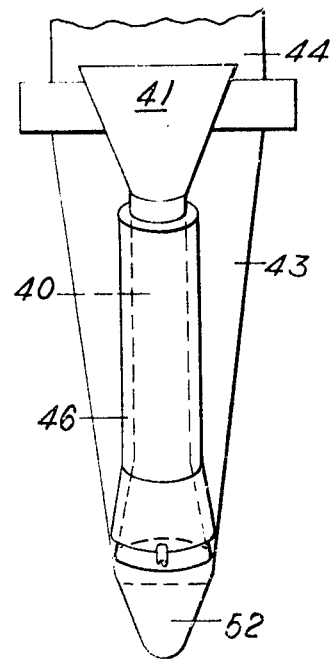
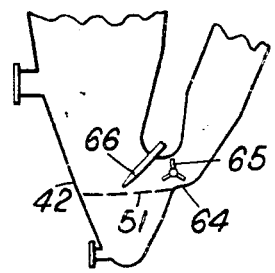

COOKING OF FOOD MORSELS

The water-impregnated morsels are heated in hot oil at the bottom of a dehydration section to convert the water in them to steam, and the steaming morsels then rise to the top to enter a cooking section where they are cooked in the steam which rises with them.

This invention relates to the cooking of morsels of certain foods which contain water and may also have water on their external surfaces.

Example of such foods are peeled potato cuttings which have been washed in water ready for conversion into fried potato products such as potato crisps or sticks. Other examples of such foods are certain corn-based products for cooking to form snack foods, and pieces of raw meat.

In the manufacture of potato crisps it is common practice to peel the potatoes, slice them and wash the slices in cold water before plunging them into a long horizontal bath of hot vegetable oil to dehydrate them and also cook them. The slices must be thoroughly washed to remove the starch grains from the cut cells on the surfaces of the slices, because otherwise the starch will gel in the hot oil, the slices will tend to stick together, and also the starch will affect heat transfer in the hot oil circulating system. However, some of the washing water tends to enter the bath with the slices and has to be steamed off, thus increasing the heating load of the cooker. If attempts to remove the washing water are made by devices such as vibrators, rollers or drip trays, they are only partially effective and tend to produce clinging together of the slices which makes the subsequent task of dehydration more difficult. Because the oil circulating through the bath requires to be well above the boiling point of water and because the cooking of the relatively small amount of dehydrated solid potato matter requires little heat compared with the latent heat heat required to turn the water into steam, any entrained water represents an even greater proportion of extra heating load with no corresponding increase in the output of crisps. Furthermore, the high oil temperature and the relatively short cooking time require considerable skill from the operative if he is to avoid discoloration or darkening of the crisps due to the chemical reaction of the sugars in the potato matter. This is because during the dehydration phase the heat from the oil converts the water in the slices to steam at atmospheric pressure. Therefore the solid matter is surrounded with steam rather than oil and tends to experience a temperature of only about 100° C. during the initial phase of conversion into steam. When the rate of conversion subsequently diminishes, the temperature of the solid matter rises towards that of the oil and darkening soon follows. Also, the oil starts to pervade the slice because the steam no longer keeps it out.

There are other disadvantages. The sudden immersion of the cold slices in the hot oil tends to produce blisters which may puncture and entrap oil. To enable the required heat transfer to take place, the oil must circulate quickly but on the other hand the progress of the slices through the bath must be slowed down by mechanical retarders. In addition, dunking devices must be provided to force the rising slices down under the surface of the oil. This in turn demands cleaning the retarders and dunking devices in order to remove any trapped slices.

The present invention seeks in its various aspects to avoid one or more of the above-mentioned disadvantages.

According to one aspect of the invention, there is provided a method of removing surface water from water-impregnated morsels of food before the morsels are dehydrated in hot oil, wherein the morsels are passed downwards through a bath of oil to cause the surface water to separate from the morsels, the oil in the bath is cold compared to the hot oil, and the separated water is removed from the bath.

Preferably, the cold oil is in one leg of generally U-form ducting, the hot oil is in the other leg, a bend section connects the lower ends of the two legs, and the separated water is drained off from the bdnd section.

According to another aspect of the invention, there is provided apparatus for cooking water-impregnated morsels of food which comprises an upwardly extending dehydration section having a bottom inlet for the morsels and connecting at its top end with a cooking section, and means for introducing hot oil into the dehydration section at such a temperature that, in operation, water in the morsels is turned into steam, the morsels and the steam rising in the dehydration section to enter the cooking section where heat from the steam is used to cook the morsels.

Preferably, the cooking section surmounts the dehydration section and provides at least one extended cooking path for the morsels.

The dehydration section preferably forms one leg of generally U-form ducting, the other leg which is a dewatering section has a top inlet for receiving morsels of water-impregnated food which also have water on their surfaces, and means are provided for removing water from the bottom of the ducting.

Figure 5:
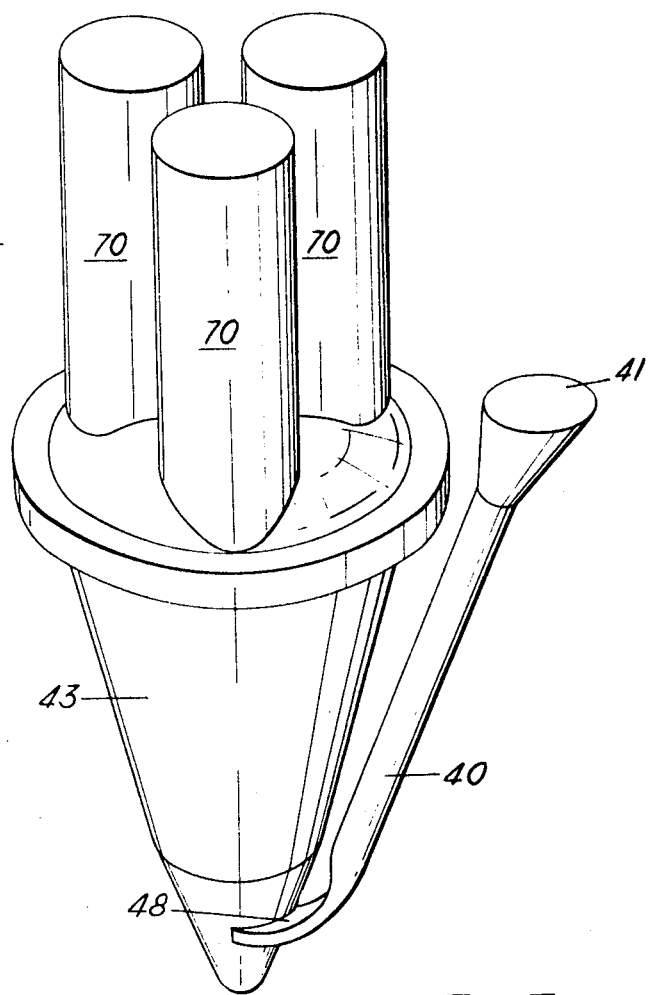
Figure 6:
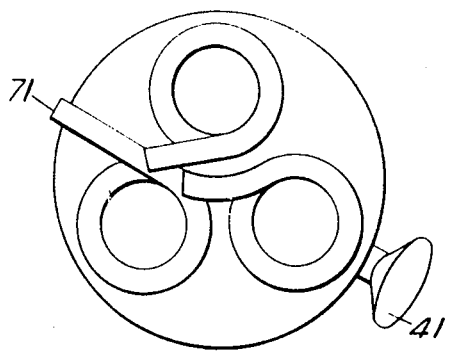
Figure 7:
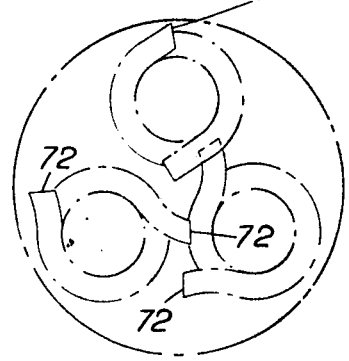

According to a further aspect of the invention, there is provided a method of cooking water-washed slices of potato in ducting of generally U-form which is partially filled with oil, comprising the steps of:

a. passing the slices downwards through one leg of the ducting which contains cold oil so as to separate the washing water from the slices, b. passing the dewatered slices through a bend section which connects the two legs of the ducting and removing the separated water through an outlet in the bend section, c. heating the slices at the bottom of the other leg in hot oil to convert water in the slices into steam so that the slices and the steam rise to the top of the hot oil, d. picking up the rising slices in a cooking section mounted above the hot oil, e. causing the slices to ascend an extended path in the cooking section, f. using heat supplied by the steam to cook the slices, g. and removing the cooked slices from the cooking section By way of example the invention will not be described with reference to the accompanying diagrammatic drawings of which:

FIG. 1 is a vertical section through a cooking apparatus of generally U-form,

FIG. 2 is a vertical section through another cooking apparatus of generally U-form, FIG. 3 is a side view of the oil-filled portion of the apparatus of FIG. 2, FIG. 4 is a detail modification shown in vertical section, FIG. 5 is a perspective view of the apparatus of FIG. 2 but showing a cooking section provided with three spiral elevators, FIG. 6 is a plan of the embodiment of FIG. 5 showing a common discharge for the elevators, and FIG. 7 is a cross section through the embodiment of FIG. 5 showing double points of pickup for the elevators.

Referring to FIG. 1, the generally U-form apparatus comprises a dewatering section 10 with a top inlet 11 for receiving food morsels, a dehydration section 13, a bend section 12 which connects the sections 10, 13, and a cooking section 14 which surmounts the section 13. The section 10 is filled with cold oil and forms a cold leg whilst the section 13 is filled with hot oil and forms a hot leg. The section 14 uses steam which has been generated in the food morsels in the section 13.

The bend section 12 is provided with a well 16 for the removal of water which is protected by a perforated floor 17 to prevent morsels of food entering the well. A valve 9 controls the removal of water from the well. The section 13 is divergent in the upward direction so that its cross section increases as it approaches the cooking section 14. At the top is an annular manifold 20 with a perforated inner wall for withdrawal of oil. The section 13, manifold 20 and an injection 18 form part of a circulation system for hot vegetable oil which includes a screening tank 23, a pump 24, a heat exchanger 25 for heating the oil and a valve 26.

The cooking section 14 is provided with a metallic spiral elevator 28 having a stem which projects downwards for a short distance into the section 13 in order to be immersed in and heated by the oil. The elevator is arranged to be given a high-frequency, low-amplitude oscillation about its vertical axis via mechanism in a housing 29 supported by radial struts from the surrounding walls of the section 14. The mechanism may for example be pulsed hydraulically from an external pump. The spiral flight of the elevator 28 cooperates with a spiral wall vane 30 to slow down the rise of the steam through the section 14. The top of the elevator flight extends through a side outlet 31. An oil arrester 34 which permits the passage of steam is located below a steam stack 35 provided with an adjustable damper 36.

To produce potato crisps for example, the apparatus may be operated in the following manner. Firstly, the sections 10, 12, 13 are filled with cold oil, the oil in the section 10 reaching an upper level opposite the manifold 20. The heat exchanger 25 is then brought into operation so that the temperature of the oil injected into the section 13 reaches the required temperature, say 175° C. The oil in the section 10 which remains relatively static compared with the forced circulation through the dehydration section 13 does not rise appreciably in temperature and is kept cold by potato slices washed in cold water which are then fed to the inlet 11. The potato slices sink down the column of relatively cold oil in the section 10 because they are denser than the oil. Water has a greater density than oil and during the descent of the slices their surface water separates from them, runs down the section wall or sinks to the bottom and is drawn off through the perforated floor 17 and well 16. Consequently such water does not reach the section 13 where it would otherwise occupy space and absorb heat during its conversion into steam. In addition, the removal of the water from the external surfaces of the slices results in a reduced tendency for the slices to stick together and in a quicker heating of the slices when they reach the hot oil in the section 13. The cold slices which are dropped into the section 10 experience a small rise in temperature as they proceed to the section 13 but no formation of steam occurs before the hot oil injector 18 is reached. During continuous operation, the oil in the duct 10 reaches a temperature of about 5° C. near the inlet 11 and about 20° C. at the upstream end of the bend section 12.

The slices which contain a high proportion of water in their inner cells pass through the bend section 12, become heated by a jet of hot oil issuing continuously from the injector 18 and rise to enter the section 13. Their oil coating promotes the transfer of heat from the hot oil to their cells and water therein is converted into steam which forms bubbles adhering to the slices. The buoyancy of the steam bubbles assists the rise of the steaming slices to the top surface of the hot oil. Because the steam is generated under oil pressure it is initially at a saturation temperature above 100° C. and it becomes superheated. The divergent shape of the section 13 slows down the rise of the hot oil and slices to match the reducing rate of steam generation and so increases the transfer of heat from the oil to the slices. It also compensates for the loss in effective flow area due to the projecting stem of the elevator 28. As the rising slices reach the surface of the hot oil, they are picked up by the flight of the elevator and are constrained to follow its spiral extending path to the top of the elevator.

The oil at the top of the section 13 is at about 160° C. and is much hotter than either the slices which may still contain a little water or the steam at that point; if the slices were to remain in the oil to be cooked such cooking would be too quick and would lead to discoloration. Accordingly, section 14 is provided for cooking the slices more slowly at the much lower temperature of the superheated steam.

The pressure within the section 14 where final drying and then cooking take place is virtually atmospheric but because of the oil pressure in the section 13 the steam (formed at say 103° C.) which rises into the section 14 is superheated steam (say at 110° C.). This steam which is received from the slices supplies the heat required for cooking in the section 14.

The extended path of the conveyor flight which the slices are forced to follow ensures sufficient time for drying and cooking them. For example the slices which may take only a few seconds to rise up the section 13 are forced to remain for about three minutes in the section 14. Finally, the dried and cooked slices which are now crisps are discharged through the outlet 31 into a receptacle or chute whilst the steam rises through the oil trap 34 to be discharged through the stack 35.

It will be seen that the hot oil system is substantially a closed circuit system with the divergent section 13 serving as a large reservoir for the oil. Once the slices enter the oil in the preliminary dewatering section 10, they travel wholly immersed in oil or in superheated steam until they reach the outlet 31. The elevator 28 provides lift through the cooking section 14 at a controlled rate. Thus the whole treatment of the slices can be closely controlled. It will be noted that the cold washed slices are not plunged into a dehydration bath of hot oil but are dewatered and warmed before they meet the hot oil of the dehydration section.

Referring to FIGS. 2 and 3, the apparatus is basically similar to that shown in FIG. 1 and comprises a ducting of generally U-form having a dewatering section 40 with a top inlet 41 for the washed food morsels, a bend section 42, a divergent dehydration section 43 and, surmounting the latter, a cooking section 44 housing a spiral elevator 45.

The section 40 which is the cold leg of the ducting and is inclined downwards towards the dehydration section 43 is provided with a water-cooled jacket 46 for possible use during startup of the apparatus.

The bend section 42 includes a flattened or fishtail portion 48 in which operates a hinged flap 49 which is adjustable between a closed setting for excluding hot oil from the cold leg 40 during startup and an open setting in which it together with the shape of the portion 48 cooperate to hamper any movement of hot oil towards the cold leg.

The bend section 42 provides a perforated floor 51 above a well 52 provided with a controlled outlet 53 for draining off water which has separated from the food morsels during descent of the cold leg 40. The floor 51 has a slight depression and faces the bottom inlet to the section 43.

The section 43 which is the hot leg of the ducting and is vertical constitutes a reservoir forming part of a hot oil circulation system similar to that described with reference to FIG. 1. An annular manifold 55 leads to an oil outlet 56 but there are two hot oil inlets provided in parallel, viz. a main inlet 57 and below it an auxiliary inlet provided by an injector 58 which faces the floor 51. The purpose of the injector 58 is to direct a curtainlike jet of oil against any food morsels which may tend to collect on the floor 51, e.g., cold morsels at startup, thereby heating them and causing them to rise and enter the section 43. The injector 58 may be operated continuously with the main inlet 57. An oscillatory elevator 45 in the section 44 provides a double spiral path for the food morsels picked up from the top of the section 43. To facilitate such pickup, an annular deflector 61 extends inwards from the wall of the the section 43 and is shaped to deflect rising morsels over the top of the adjacent sidewall of the elevator flight. This has the advantage that it provides an annular pickup instead of a point or double-point pickup. The deflector is perforated to permit passage of the rising steam.

In the preferred modification shown in FIG. 4, the end section 42 connecting the cold and hot legs is formed with a small bottom shelf 64 against which brush the blades of a rotatable star-wheel or rotary paddle 65 which lies in a restricted passage near the bottom end of the cold leg 40. The star-wheel which may be positively driven will permit food morsels to pass down the section 42 but will obstruct any flow of hot oil past it to the cold leg. The auxiliary hot oil injector 58 of FIG. 2 is replaced by an auxiliary injector 66 which also directs a curtainlike jet of hot oil towards the floor 51 but with a downstream or targential component of motion. The disturbances created by the operation of the star-wheel 65 and the injector 66 keep the floor 51 clear of deposits of food morsels.

FIGS. 5 and 6 show a grouping of their spiral elevators 70 arranged in parallel above the dehydration section 43 and having the tops of their flights arranged to feed a common outlet 71 for the crisps or other cooked food morsels. The use of more than one elevator in the slow cooking section permits an increased output from the apparatus.

FIG. 7 shows how the three elevators 70 with double flights may have double pickup points 72 which are arranged at the top of the section 43, each pickup point lying in one of six notional concentric paths.

I claim:

1. Apparatus for cooking water-impregnated morsels of food which comprises an upwardly extending dehydration section having a bottom inlet for the morsels and connecting at its top end with a cooking section, and means for introducing hot oil into the dehydration section at such temperature that, in operation, water in the morsels is turned into steam, the morsels and the steam rising in the dehydration section to enter the cooking section where heat from the steam is used to cook the morsels, said cooking section surmounting the dehydration section and providing at least one extended cooking path for the morsels, said extended path being provided by a vibratable spiral elevator.

2. Apparatus according to claim 1, wherein the spiral elevator has a stem which extends downwards into the dehydration section.

3. Apparatus according to claim 1, wherein a deflector is provided at the top end of the dehydration section for deflecting rising morsels inwards on to the elevator flight.

4. Apparatus according to claim 1, wherein the elevator has a double spiral flight.

5. Apparatus for cooking water-impregnated morsels of food which comprises an upwardly extending dehydration section having a bottom inlet for the morsels and connecting at its top end with a cooking section, and means for introducing hot oil into the dehydration section at such a temperature that, in operation, water in the morsels is turned into steam, the morsels and the steam rising in the dehydration section to enter the cooking section where heat from the steam is used to cook the morsels, said cooking section surmounting the dehydration section and including a plurality of vibratable spiral elevators which provide extended cooking paths in parallel relationship for the morsels.

6. Apparatus for cooking water-impregnated morsels of food which comprises an upwardly extending dehydration section having a bottom inlet for the morsels and connecting at its top end with a cooking section, means for introducing hot oil into the dehydration section at such a temperature that, in operation, water in the morsels is turned into steam, the morsels and the steam rising in the dehydration section to enter the cooking section where heat from the steam is used to cook the morsels, said dehydration section forming one leg of generally U-form ducting, the other leg which is a dewatering section having a top inlet for receiving morsels of water-impregnated food which also have water on their surfaces, and means for removing water from the bottom of the ducting.

7. Apparatus according to claim 6, wherein the ducting adjacent the lower end of the dewatering section has a section which is shaped to restrict the entry of oil from the dehydration section to the dewatering section.

8. Apparatus according to claim 6, wherein a rotatable starwheel is provided adjacent the lower end of the dewatering section and arranged to restrict the entry of oil from the dehydration section to the dewatering section.

9. Apparatus according to claim 6, wherein the dehydration section is vertical and the dewatering section is inclined downwards towards the dehydration section.

10. Apparatus according to claim 6, wherein a bend section of the ducting which connects the two legs provides a perforated floor above an outlet for draining off water.

11. Apparatus according to claim 10, wherein the perforated floor forms a shallow depression which faces the bottom inlet of the dehydration section.

12. Apparatus according to claim 10, wherein a nozzle is provided for directing a jet of hot oil against the floor.

13. Apparatus according to claim 12, wherein the nozzle is inclined in the direction of motion of the morsels across the floor.

14. Apparatus for cooking water-impregnated morsels of food which comprises an upwardly extending dehydration oil section having a bottom inlet for the morsels, a bottom inlet for oil, a top outlet for the morsels and a top outlet for oil, the dehydration section being part of a hot oil circulating system and forming a straight section which permits a free upward flow of hot oil, and a stem cooking section arranged to connect directly above-said dehydration oil section with the top outlet for the morsels, whereby in operation steam generated from the morsels entering the dehydration section rises with the free upward flow of hot oil and morsels to the top of the dehydration section, the steam so generated and the morsels thereafter rising through the cooking section where the same steam completes the cooking of the morsels.

15. Apparatus according to claim 14, wherein the cooking section surmounts the dehydration section and provides at least one extended cooking path for the morsels.

16. Apparatus according to claim 14, wherein means are provided for slowing down the rise of the oil and morsels in the dehydration section.

17. Apparatus according to claim 14, wherein the dehydration section is smoothly divergent in the upward sense.

18. Apparatus according to claim 14 further including means for raising the morsels through said cooking section.

* * * * *